(12) United States Patent
South et al.

(10) Patent No.: US 7,614,504 B2
(45) Date of Patent: Nov. 10, 2009

(54) OPEN-END FLOW ENTRANCE SPIN-ON FILTER

(75) Inventors: Kevin C. South, Cookeville, TN (US); Ismail C. Bagci, Cookeville, TN (US); Gregory W. Hoverson, Cookeville, TN (US)

(73) Assignee: Cummins Filtration IP Inc., Minneapolis, MN (US)

( * ) Notice: Subject to any disclaimer, the term of this patent is extended or adjusted under 35 U.S.C. 154(b) by 165 days.

(21) Appl. No.: 11/137,875

(22) Filed: May 26, 2005

(65) Prior Publication Data

US 2006/0186036 A1    Aug. 24, 2006

Related U.S. Application Data

(63) Continuation-in-part of application No. 10/778,694, filed on Feb. 16, 2004, now Pat. No. 7,434,697.

(51) Int. Cl.
*B01D 35/28* (2006.01)

(52) U.S. Cl. .................. 210/443; 210/440; 210/444; 210/450; 210/445; 210/455

(58) Field of Classification Search .......... 210/232, 210/444
See application file for complete search history.

(56) References Cited

U.S. PATENT DOCUMENTS

| 3,727,764 | A | * | 4/1973 | Ogden, Hubert S. | ........ 210/232 |
| 4,021,342 | A | * | 5/1977 | Schacht et al. | ........ 210/94 |
| 4,067,812 | A | * | 1/1978 | Drori | ........ 210/310 |
| 4,863,599 | A | | 9/1989 | Guenther et al. | |
| 4,933,093 | A | | 6/1990 | Keller | ........ 210/774 |
| 5,035,797 | A | * | 7/1991 | Janik | ........ 210/232 |
| 5,080,787 | A | * | 1/1992 | Brown et al. | ........ 210/232 |
| 5,084,162 | A | * | 1/1992 | Conti | ........ 210/232 |
| 5,104,537 | A | | 4/1992 | Stifelman et al. | ........ 210/440 |
| 5,114,572 | A | * | 5/1992 | Hunter et al. | ........ 210/120 |

(Continued)

FOREIGN PATENT DOCUMENTS

WO    WO 83/01580 A1    5/1983

(Continued)

OTHER PUBLICATIONS

First Office Action issued by SIPO in CN 200680018293.X, dated Apr. 17, 2009 (translation only).

*Primary Examiner*—Walter D Griffin
*Assistant Examiner*—Denise R Anderson
(74) *Attorney, Agent, or Firm*—Hamre, Schumann, Mueller & Larson, P.C.; J. Bruce Schelkopf (57) ABSTRACT

A fluid filter constructed and arranged for threaded engagement with a fluid-delivery head for the filtration of an incoming fluid includes a molded plastic shell having a sidewall formed with a retaining ridge, a closed end and an opened end surrounded by a series of external threads, a fluid filter media pack installed into the fluid filter shell, the media pack including filtering media and an upper endplate bonded to the upper end of the filtering media, wherein the upper endplate includes a peripheral lip that is constructed and arranged to snap into position axially beneath the retaining ridge. The threaded engagement between the fluid filter shell and the fluid-delivery head eliminates the need for any nutplate.

23 Claims, 8 Drawing Sheets

U.S. PATENT DOCUMENTS

| | | | |
|---|---|---|---|
| 5,118,417 A | | 6/1992 | Deibel |
| 5,128,034 A | * | 7/1992 | Kool .......................... 210/232 |
| 5,171,430 A | | 12/1992 | Beach et al. |
| 5,182,015 A | * | 1/1993 | Lee ............................. 210/94 |
| 5,258,118 A | | 11/1993 | Gouritin et al. ............. 210/206 |
| 5,342,519 A | | 8/1994 | Friedman et al. |
| 5,462,658 A | | 10/1995 | Sem .......................... 210/172 |
| 5,549,821 A | | 8/1996 | Bounnakhom et al. |
| 5,653,871 A | * | 8/1997 | Thomsen .................... 210/232 |
| 5,667,678 A | * | 9/1997 | Dye et al. ................... 210/232 |
| 5,681,461 A | * | 10/1997 | Gullett et al. ............... 210/232 |
| 5,695,636 A | * | 12/1997 | Gullett ....................... 210/232 |
| 5,762,788 A | * | 6/1998 | Gullett ....................... 210/232 |
| 5,868,932 A | | 2/1999 | Guichaoua et al. .......... 210/440 |
| 6,024,229 A | | 2/2000 | Ayers |
| 6,073,937 A | * | 6/2000 | Stevens et al. .............. 277/653 |
| 6,533,931 B1 | * | 3/2003 | Reid .......................... 210/232 |
| 6,635,175 B2 | * | 10/2003 | Stankowski ................. 210/232 |
| 6,679,990 B2 | | 1/2004 | Reinhart |
| 6,752,924 B2 | * | 6/2004 | Gustafson et al. ........... 210/232 |
| 6,837,993 B2 | * | 1/2005 | Clausen et al. .............. 210/232 |
| 2001/0037969 A1 | * | 11/2001 | Stankowski ................. 210/348 |
| 2002/0170279 A1 | * | 11/2002 | Gustafson et al. ............. 55/510 |
| 2002/0185454 A1 | * | 12/2002 | Beard et al. ................. 210/749 |
| 2005/0178717 A1 | | 8/2005 | Bagci et al. ................. 210/444 |

FOREIGN PATENT DOCUMENTS

WO    PCT/US06/18202    10/2006

\* cited by examiner

OPEN-END FLOW ENTRANCE SPIN-ON FILTER

CROSS REFERENCES TO RELATED APPLICATIONS

The present application is a continuation-in-part patent application of U.S. patent application Ser. No. 10/778,694, filed Feb. 16, 2004, now U.S. Pat. No. 7,434,697, by inventors Ismail C. Bagci, et al., entitled "A DISPOSABLE, SPIN-ON FILTER", which application is expressly incorporated herein by reference in its entirety.

BACKGROUND OF THE INVENTION

The present invention relates in general to fluid filters and the selected design for connecting the filter to a mounting base or head. More specifically, the present invention relates to a spin-on filter that is constructed and arranged without using a nutplate for connecting the filter to a mounting base or head. By eliminating the nutplate, the resultant fluid filter is less expensive to fabricate, including cost savings by eliminating one of the component parts. A related benefit is the ability to have a mostly non-metallic construction for the fluid filter that in turn allows it to be considered "disposable" since it can be incinerated for disposal or recycling. By providing a construction that is incinerable, the structural mass of the filter can be reduced to low volume ash and this limits what will be added to landfills. The other option for "disposal" is to recycle the plastics used in the construction. Presently, when there is an all-plastic construction for a filter, it is generally described as having an "environmentally friendly green design".

In one embodiment of the present invention, the focus is directed to a fluid filter construction that consists mostly or predominantly of non-metallic components and is considered to be disposable. This embodiment does not include the traditional nutplate for threaded connection to the head. Instead, the open end of the shell is externally threaded for connection to the head, enabling the elimination of the nutplate. In a related embodiment of the present invention, the filter housing or shell is a "hybrid" in that it includes both metal and plastic. This related embodiment also does not include the traditional nutplate for threaded connection to the head.

Typical spin-on fluid filters according to prior art designs are mounted to the head (spud) by the use of an internally-threaded metal nutplate. The nutplate is anchored to the fluid filter canister and includes at least one flow inlet and a flow exit cooperating with a centertube. The filter-to-head mounting includes a seal to prevent leakage between the head and the filter. Flow to the filter travels by way of the head and, once it is filtered, the fluid exits by way of the head. In order to fabricate a fluid filter using a nutplate, there are costs associated with the fabrication of the nutplate and costs associated with assembly of the nutplate into the fluid filter. If the nutplate could be eliminated from the fluid filter, these costs would be saved. While there may be, on a limited basis, other techniques used for connecting a fluid filter to a mounting head, one aspect of the present invention is directed to the elimination of any nutplate from the fluid filter. A consequence of this design is the elimination of the nutplate for use in connection to the head.

The present invention provides a fluid filter design that is capable of spin-on, threaded mounting to a head without using a nutplate. A typical prior art mounting head includes an externally-threaded post or portion that is received by the internally-threaded nutplate. With a non-nutplate construction, according to the present invention, the spin-on fluid filter attaches to the head by way of the externally threaded open end of the fluid filter shell. In the fluid filter construction disclosed by U.S. patent application Ser. No. 10/778,694, a threaded post is configured as part of the closed end of the canister and connects to a shaft (internally-threaded) that extends beyond the head into the spin-on filter. As described therein, there are various alternative embodiments. These embodiments include, among other features, fixing the shaft as part of the fluid filter and connecting the shaft to a cooperating portion of the head. It should also be understood that the use of "spin-on" to describe the fluid filter of the present invention is intended to include not only threaded engagement, but other connection techniques, such as the use of a bayonet connection between the fluid filter and the mounting head. Related to a bayonet connection are quarter-turn and half-turn connections that may assume a variety of structural forms.

With respect to the "hybrid" shell embodiment of the present invention, it is appropriate to discuss potential concerns with an all-plastic, unitary shell or housing. It is believed that an all-plastic construction, with threads on the outside diameter of the shell adjacent the open end, lends itself well to smaller diameters and shorter lengths, such as shells that are less than 7 inches tall. However, as fluid filters become larger in terms of the diameter and height, the unitary construction using all plastic can become technically and/or financially limiting. For example, additional amounts of plastic may be required in order to maintain the required strength for the higher stress levels. The injection molding tooling becomes more costly and the injection molding process requires a press design with larger tonnage. Using a hybrid shell with a metal body and a plastic sleeve for the threaded end of the metal body, according to the present invention, addresses some of these concerns.

BRIEF SUMMARY OF THE INVENTION

A fluid filter constructed and arranged for threaded engagement with a fluid-delivery head according to one embodiment of the present invention comprises a fluid filter shell having a sidewall formed with a retaining ridge, a fluid filter media pack installed into the fluid filter shell, the fluid filter media pack including filtering media and an upper endplate bonded to an upper end of the filtering media and the upper endplate including a peripheral lip that is constructed and arranged to snap into position axially beneath the retaining ridge.

One object of the present invention is to provide an improved fluid filter.

Related objects and advantages of the present invention will be apparent from the following description.

DETAILED DESCRIPTION OF THE INVENTION

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention includes, as one component, a fluid filter shell that is preferably a unitary, molded plastic component. This construction comprises the preferred embodiment of the present invention, even though occasionally concerns have been raised regarding a unitary plastic construction for fluid filter shells having larger diameters and heights exceeding approximately 7 or 8 inches. For these larger shell sizes, when there is a desire to shift from plastic to metal, the present invention includes a hybrid construction with a metal shell body and a molded plastic sleeve that includes an insert-molded metal ring.

Figure 1:
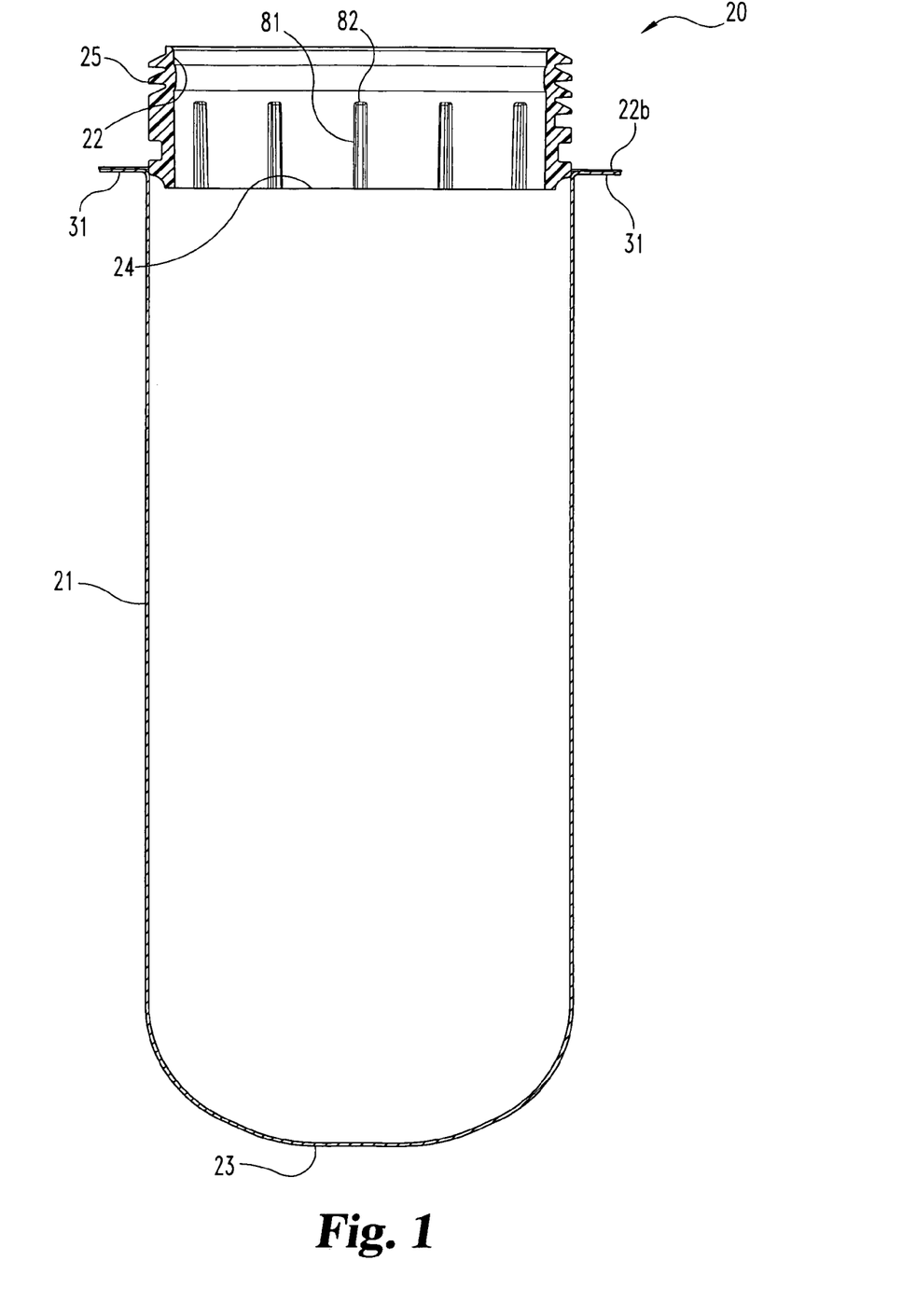
FIG. 1 is a front elevational view, in full section, of a hybrid fluid filter shell according to one embodiment of the present invention.
Figure 2:
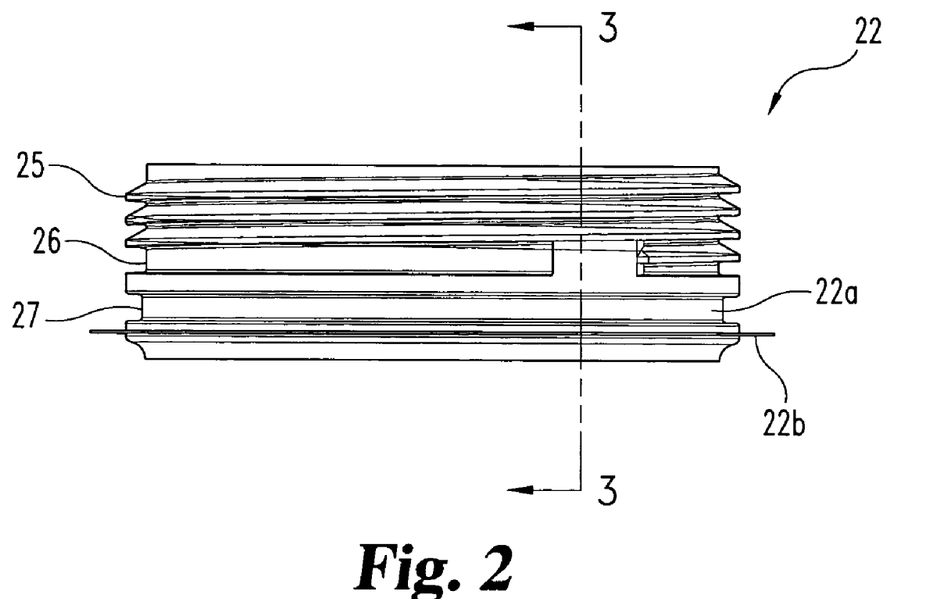
FIG. 2 is a front elevational view of an externally threaded sleeve comprising a portion of the FIG. 1 fluid filter shell.
Figure 3:
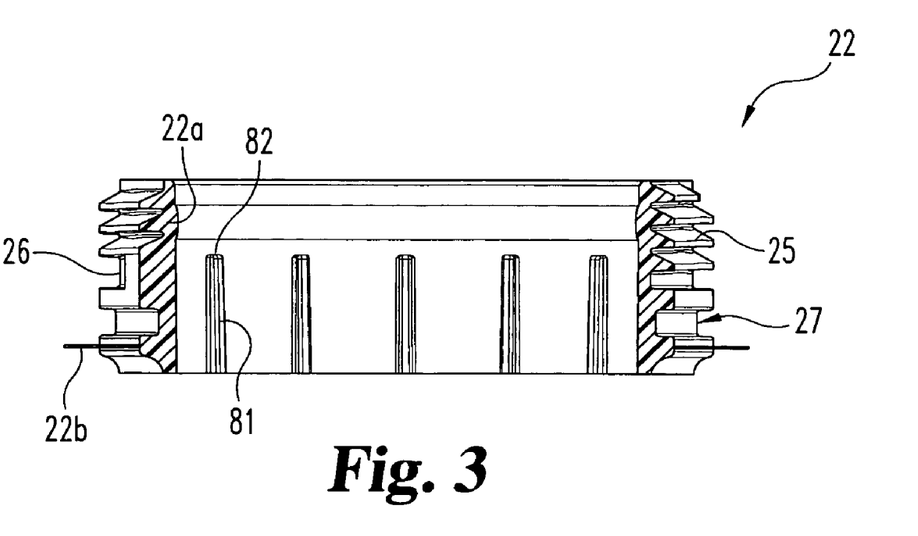
FIG. 3 is a front elevational view, in full section, of the FIG. 2 sleeve.
Figure 7:
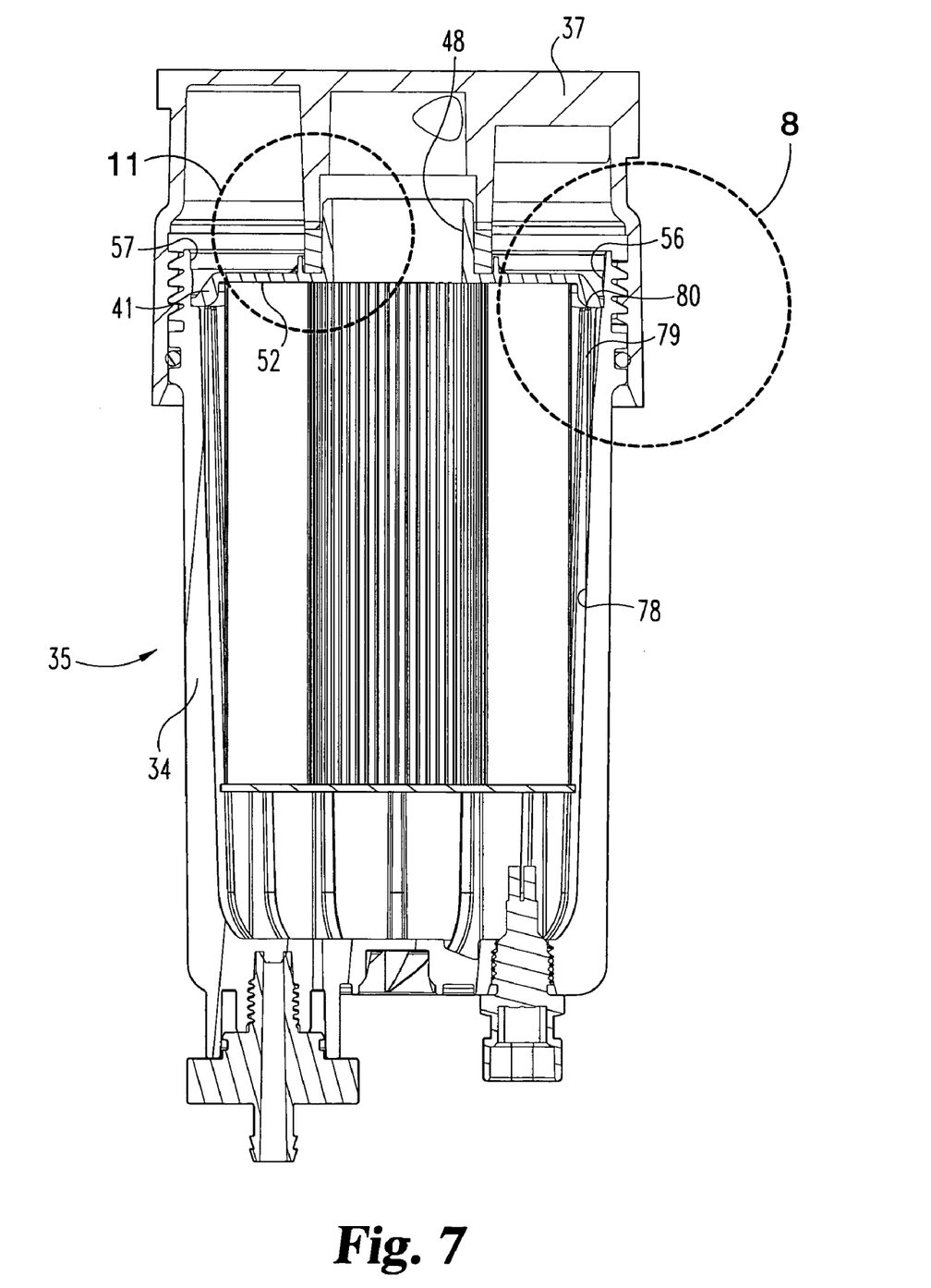
FIG. 7 is a side elevational view, in full section, of the FIG. 4 fluid filter, as assembled by threaded engagement to the FIG. 4 head.
Figure 8:
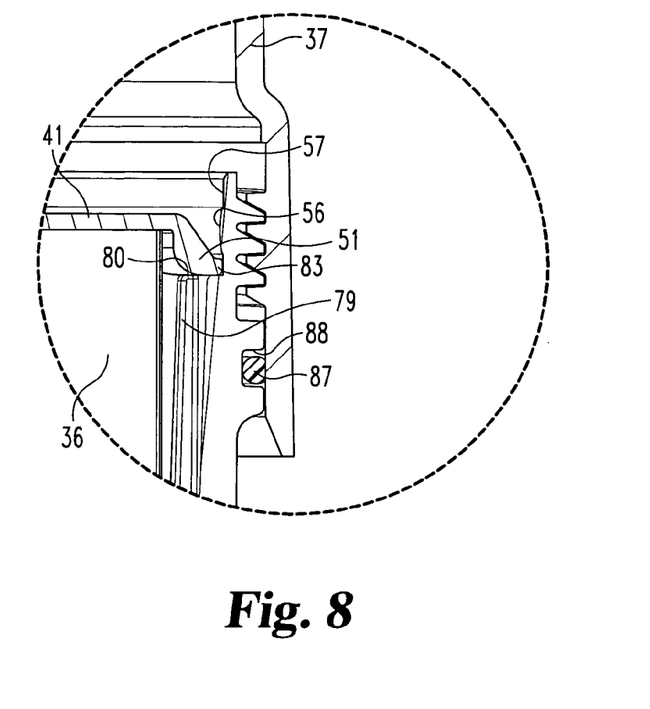
FIG. 8 is an enlarged detail of one portion of the FIG. 7 assembly.

Referring first to FIGS. 1, 2, and 3, there is illustrated what has been described as a hybrid fluid filter shell 20, sometimes referred to as a canister or housing. Hybrid shell 20 is constructed and arranged, according to the present invention, with a part-plastic and part-metallic construction. More specifically, shell 20 includes a metal shell body 21 and a cooperating annular sleeve 22 (see FIGS. 2 and 3). Shell body 21 is substantially cylindrical with a closed end 23 that is slightly rounded or dome-shaped and an open end 24 that receives sleeve 22. Shell body 21 is preferably fabricated out of steel and can be fabricated by a variety of metal working techniques, preferably by a deep draw operation. Sleeve 22 is a unitary, molded plastic component with external threads 25. Of particular importance to this first embodiment is to note that sleeve 22 is configured so as to include a unitary, molded plastic sleeve body 22a and an insert-molded, annular metal ring 22b. The insert-molding of metal ring 22b, as part of sleeve body 22a, securely joins these two components into integral sleeve 22. Formed into the outer surface 26 of sleeve body 22a, below threads 25, is an annular groove 27 for capturing and retaining an external O-ring. A similar or corresponding O-ring is illustrated in FIGS. 7 and 8. This particular sealing location is designed for sealing between the shell and the head in terms of incoming fluid flow.

The insert-molded metal ring 22b is preferably fabricated out of steel and is used to seam together the sleeve 22 and the deep drawn steel shell body 21. In order to accomplish this seaming operation, the steel shell body is fabricated with an annular, radial flange 31 adjacent open end 24 (see FIG. 1). As the sleeve 22 is inserted into open end 24, the insert-molded ring 22b is pushed into planar contact with flange 31. With these two metal flanges in contact, the layered combination is tightly rolled onto itself throughout the full 360 degree circumference of the shell body 21 and sleeve 22 (i.e., the seaming operation).

With the lower end of sleeve 22 inserted down into the shell body before the seaming operation begins, the shell body 21 and sleeve 22 are then securely joined together in order to create a hybrid (plastic and metal) fluid filter shell 20. As will be described hereinafter in connection with a second embodiment of the present invention, the fluid filter media pack or filter cartridge to be used with the selected shell is secured with a snap-fit or alternatively with a press-in interference fit. These two embodiments apply regardless of whether the hybrid shell 20 is utilized or a unitary, molded plastic shell is used. These assembly options are described in greater detail in connection with the second embodiment of the present invention in terms of a unitary, molded plastic shell. Nevertheless, these two assembly options are equally applicable to this first embodiment of the hybrid fluid filter shell.

Figure 4:
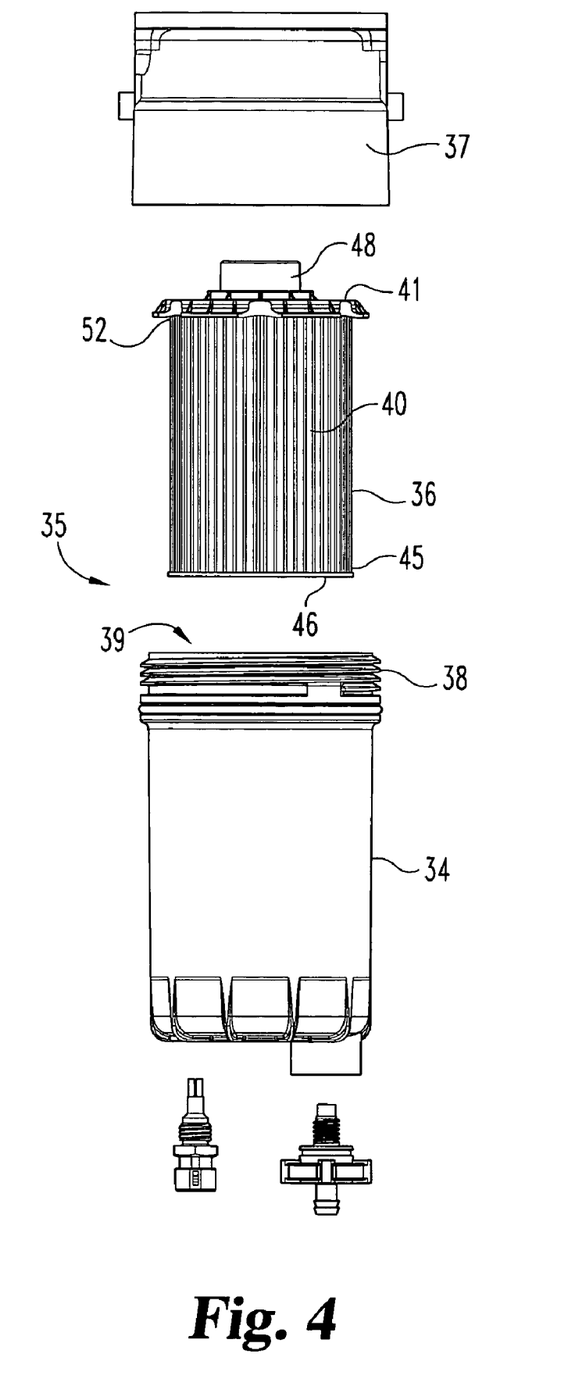
FIG. 4 is an exploded, front elevational view of a fluid filter constructed and arranged for threaded engagement with a fluid-delivery head.
Figure 5:
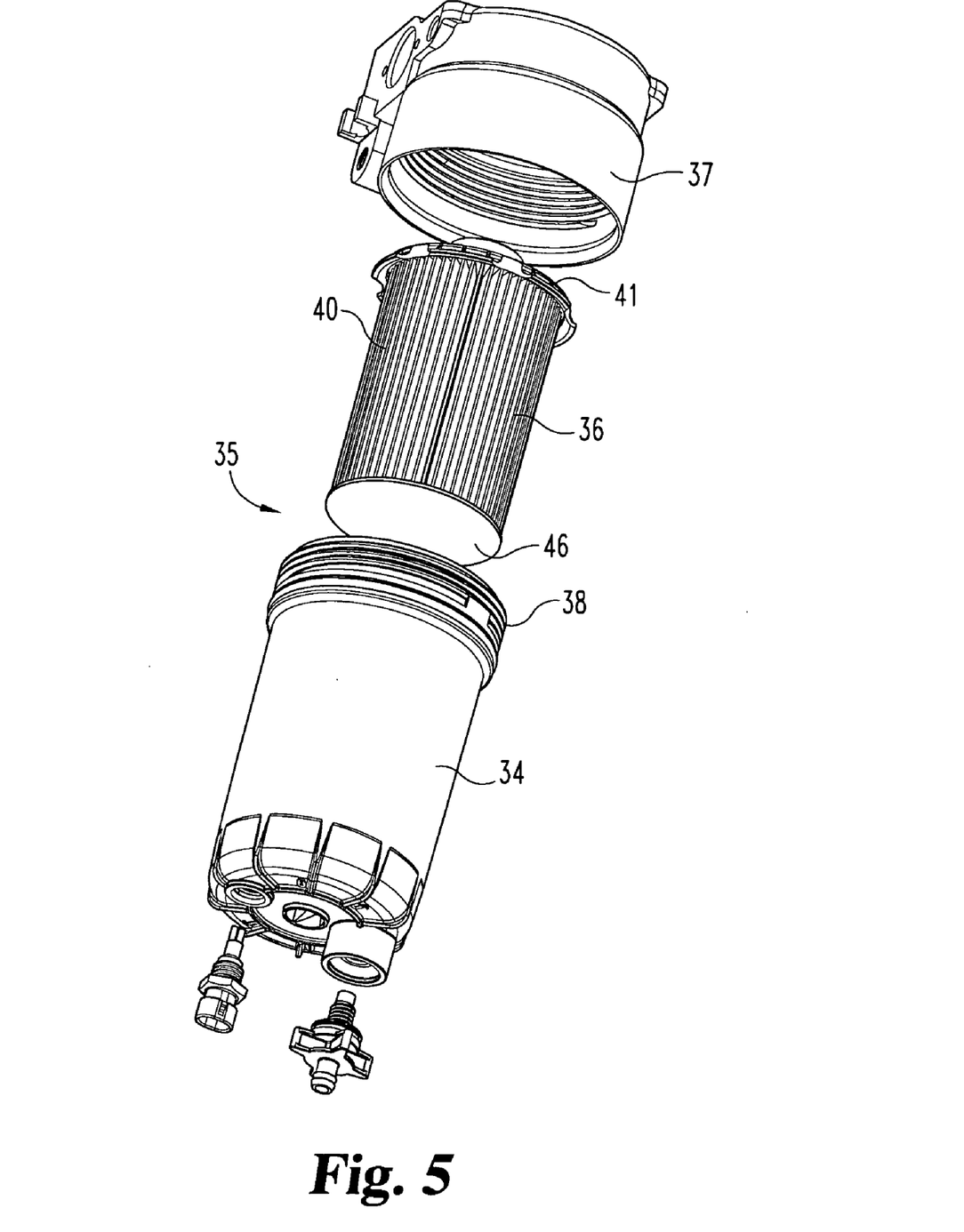
FIG. 5 is an exploded, perspective view of the FIG. 4 fluid filter and head combination.

The preferred embodiment of the present invention includes a unitary, molded plastic fluid filter shell 34. One representative construction of this preferred design is illustrated in FIGS. 4 and 5 in conjunction with fluid filter 35. Fluid filter 35 includes molded plastic shell 34 and fluid filter media pack 36. Included, as part of the FIG. 4 and FIG. 5 illustrations, is the head 37 that receives the externally-threaded end 38 of shell 34. The head 37 provides the fluid communication for fluid filter 35, including the routing of incoming fluid and the handling of the exiting fluid after passing through the filter media.

Since the present invention includes a wide open shell in terms of open end 39 and no nutplate, the specific construction of the media pack 36 and its relationship to shell 34 are important. Media pack 36 includes the filtering media 40 that is constructed and arranged in a generally cylindrical form and a cooperating upper endplate 41 that is securely bonded to the filtering media 40. As would be understood for filter modules of this type, the center of the filtering media has a hollow cylindrical form for the upward passage of fluid after passing through the filtering media.

While the opposite or lower face 45 of the filtering media 40 must be closed off by some style of endplate 46 to preclude bypassing the filtering media, its construction relative to the other components is not critical since it has no interfacing properties in a structural sense relative to the fluid filter shell 34. Although the lower face 45 of the filtering media 40 and endplate 46 are effectively suspended in the interior of the fluid filter shell and do not pose any interference or abutment concerns, the arrangement that enables this suspended condition is important in terms of how the fluid filter media pack 36 interfaces with fluid filter shell 34 once the shell is threaded into engagement with the fluid-delivery head 37. It is also important to position the upper endplate 41 at the correct location relative to the interior of head 37 once the fluid filter shell 34 is completely or fully threaded into head 37.

Figure 6:
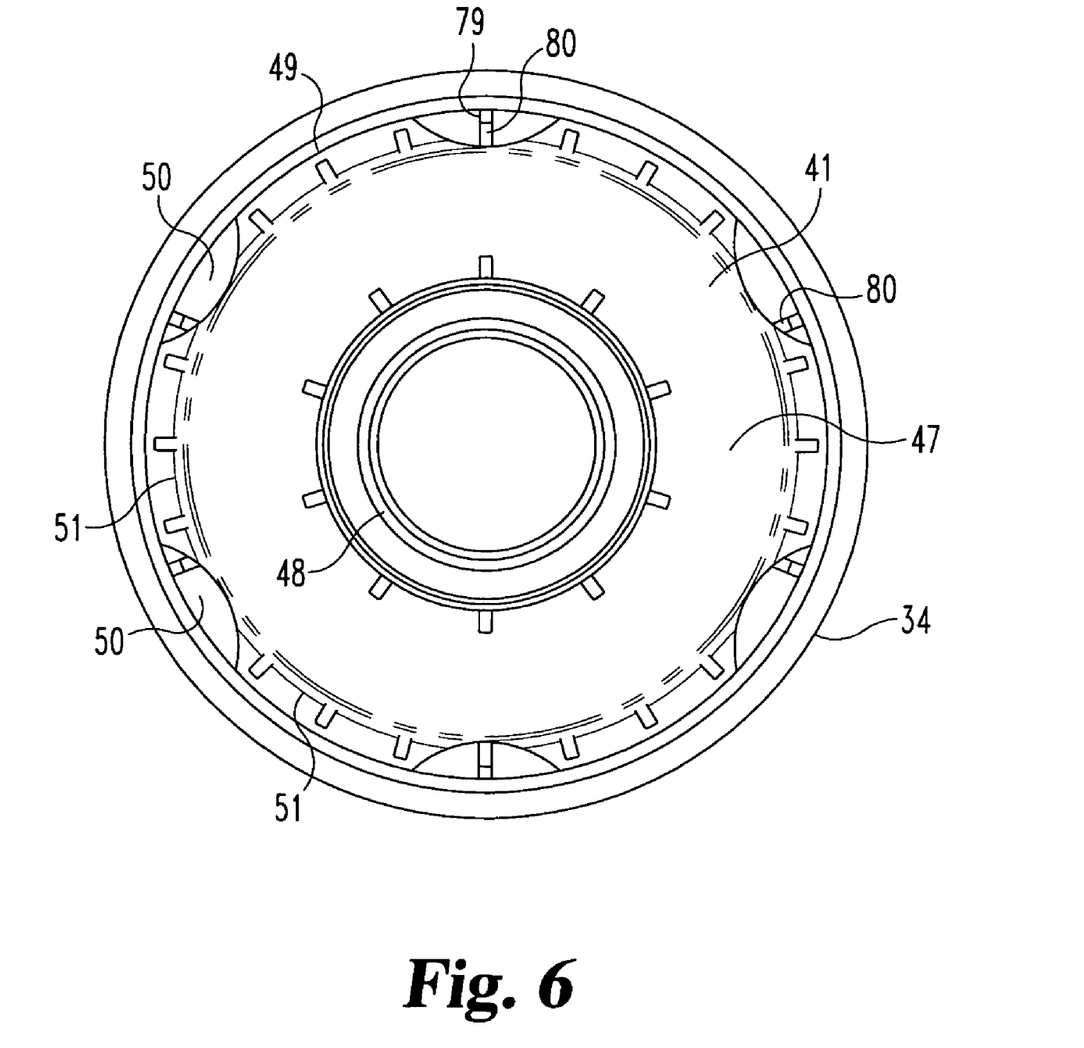
FIG. 6 is an enlarged top plan view of the FIG. 4 fluid filter media pack, according to the present invention.

Referring now to FIG. 6, the fluid flow configuration of endplate 41 relative to the fluid filter shell 34 is illustrated. As is illustrated, the upper endplate 41 has a generally circular or annular form with a flange 47 and an upwardly extending, hollow sleeve 48 that is concentric with flange 47. Endplate 41 is a unitary, molded plastic component with an outer peripheral retaining lip 49 that surrounds flange 47 and is segmented by the presence of six, equally-spaced, concave-shaped openings 50. The segments or arc-shaped sections 51 of lip 49 are equally spaced and are in alternating sequence with openings 50. The number of openings, their spacing, and their shape are all variables in terms of alternatives being contemplated and permitted. The number can be increased or decreased, the spacing can be unequal, and the shape can be changed. As will be described, the openings 50 constitute flow holes for the incoming fluid from head 37. Sleeve 48 is concentric with the hollow interior of the cylindrical filtering media 40 and provides the exit passage for the fluid returning to head 37 after passing through filtering media 40.

The fluid to be filtered and flowing into fluid filter 35 from head 37 finds its way to the six, equally-spaced openings 50. This fluid is drawn through the filtering media 40 and flows out through sleeve 48 back into head 37. In order for this flow pattern to be realized in a uniform, reliable, and leak-free manner, the upper endplate 41 is securely bonded to the upper end or face 52 of filtering media 40. This secure connection between the endplate 41 and the filtering media 40 is also important in terms of how the fluid filter media pack 36 is assembled into the fluid filter shell 34 and how this media pack is suspended in the shell, as is illustrated in FIG. 7.

In the preferred embodiment of the present invention, the fluid filter media pack 36 snaps into fluid filter shell 34 by the cooperative assembly of lip 49 of endplate 41, specifically sections 51 being positioned beneath an inwardly directed annular retaining ridge 56 that is unitarily molded as part of the inner surface 57 of fluid filter shell 34 (see FIG. 7 and the enlarged detail of FIG. 8). Each of the lip sections 51 are able to individually flex in an upward direction as the fluid filter media pack 36 is pushed into the open end 39 of fluid filter shell 34 and the retaining ridge 56 is encountered. This ability to flex enables each section 51 to ride up and over the retaining ridge 56 as the media pack 36 is inserted into fluid filter shell 34. On the back side, when the reduced inside diameter due the presence of retaining ridge 56 ends, the sections 51 return to their normal (unflexed) state. The outer peripheral surface (outside diameter) of lip 49 is positioned below retaining ridge 56 and in close proximity to the inside surface of fluid filter shell 34, see FIGS. 7 and 8. While there is some slight degree of flexibility to the individual sections 51, as has been described, the endplate 41 is still considered to be a substantially rigid, plastic component and it is only the cantilevering of sections 51 and their individual construction due to openings 50 that allow sufficient flexibility to pass over and then snap in beneath retaining ridge 56.

While retaining ridge 56 is preferably of an annular form, an alternative is to configure the ridge into sections with an alternating clearance space between adjacent sections. Since the media pack 36 is non-directional in terms of how it inserts into fluid filter shell 34, the only caveat as to the ridge sections is that they must retain the media pack. This then becomes an issue of the ridge section circumferential lengths and the circumferential length of each lip section 51. In a worst-case orientation, there needs to be sufficient overlap in order to securely retain the media pack 36 in the fluid filter shell 34.

Once assembled in this fashion, any attempt to pull fluid filter media pack 36 out of the fluid filter shell 34 causes the upper, outer portion of each section 51 to abut up against the underside surface of retaining ridge 56 and this abutment prevents the removal of fluid filter media pack 36. This result is achieved whether the retaining ridge 56 is annular or segmented. In terms of describing this as preventing removal, it should be understood that if the fluid filter media pack 36 is crushed or destroyed in some fashion, such that the individual sections 51 might clear the retaining ridge 56, then the fluid filter media pack 36 might be able to be removed. However, due to this snap-in assembly technique, and in view of the materials and the positioning of the various components relative to each other, any attempt to cut, crush, snap, bend, or sever the individual sections 51 or other portions of media pack 36 are considered to be high risk in terms of possible damage to shell 34 and clearly require a substantially time investment. This in part is why this preferred embodiment of the present invention is considered to a fully-disposable fluid filter. In terms of the present invention, the concept of being fully disposable includes the substantially or predominantly all plastic construction and the ability to incinerate the used fluid filter 35 once the filtering media 40 becomes clogged with filtered particulate, at least to the degree that its filtering ability has dropped to an unacceptable level. Another aspect of being fully disposable, in terms of the entire fluid filter 35, is that the plastic construction for the component parts contributes to a lower cost design that one can afford to dispose of once the filtering media is clogged.

Figure 9:
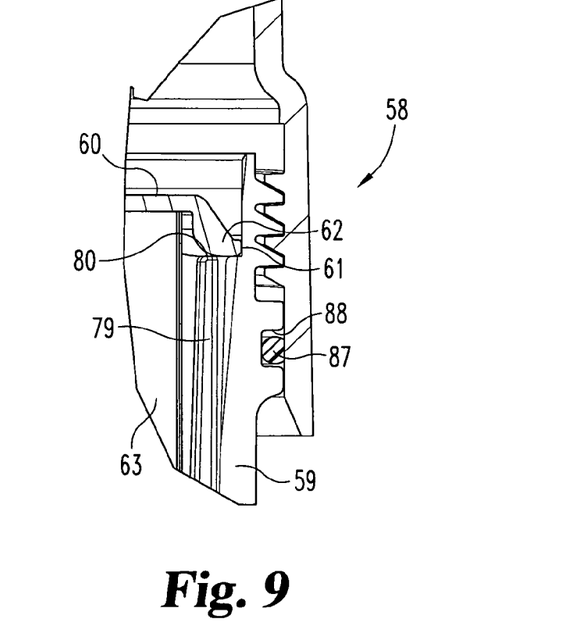
FIG. 9 is an enlarged detail corresponding to the FIG. 8 view and depicting another embodiment of the present invention.

Referring now to FIG. 9, a design alternative to fluid filter 35, according to the present invention, is illustrated. FIG. 9 represents a portion of a fluid filter 58 that is virtually identical in every respect to fluid filter 35, except that the retaining ridge 56 of fluid filter 35 has been removed. As such, the inner surface of fluid filter shell 59 in the location of retaining ridge 56 is generally cylindrical. In this alternative embodiment of fluid filter 58, the endplate 60 is virtually identical to endplate 41, except that endplate 60 has a slightly larger outside diameter so that the outer peripheral edges 61 of the six, equally-spaced lip sections 62 create a secure, interference press-fit between the endplate 60 and the inside cylindrical surface of the plastic fluid filter shell 59. Creating fluid filter 58 with a press-fit for the fluid filter media pack 63 into the shell 59 results in a fully disposable design in terms of the predominantly plastic construction and in terms of the cost for the plastic components. Similar to the prior snap-in embodiment of the present invention, the fluid filter media pack 63 is not constructed and arranged to be pulled out and replaced while reusing the fluid filter shell 59. As noted, with the exception of the change from a snap-in assembly to a press-fit (interference) assembly, fluid filter 58 is identical to fluid filter 35. Both are predominantly plastic and both are intended to be fully disposable wherein the fluid filter media pack is disposed of along with the fluid filter shell.

Figure 10:
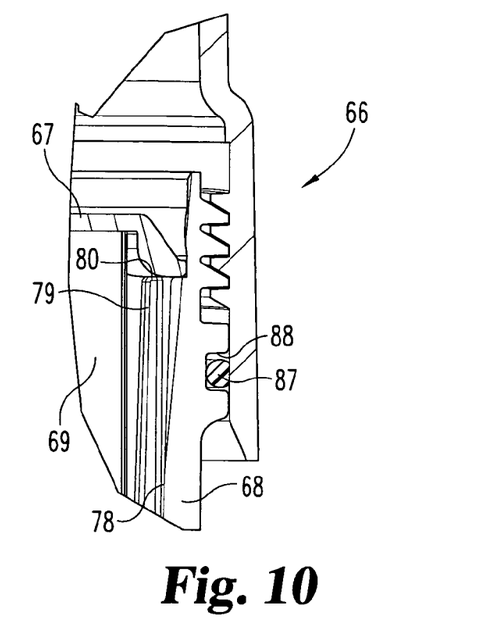
FIG. 10 is an enlarged detail corresponding to the FIG. 8 view and depicting another embodiment of the present invention.

A third embodiment (see FIG. 10) is contemplated as part of the present invention. Fluid filter 66, according to this third embodiment, is a combination of the first two embodiments in that the endplate 67 is identical to endplate 41 and the fluid filter shell 68 is identical to fluid filter shell 59. This combination of features means that there is no retaining ridge 56 and there is no interference press-fit. This allows the fluid filter media pack 69 to be replaceable such that the media pack 69 is discarded when clogged or otherwise past its useful life and the housing or shell 68 is retained and reused. As will be described hereinafter, the replaceable fluid filter media pack is supported by axially-extending ribs and clamped in place by a gasket that is pushed on axially by the head.

In each of the three fluid filter embodiments disclosed herein, the option exists of using the hybrid fluid filter shell 20. However, it should be recognized that the use of metal (steel) for the shell body 21 has an effect on the disposable status since the metal cannot be incinerated for effective disposal and the cost is greater than plastic. This of course may result in something of a trade off in terms of cost depending on the additional plastic that may have to be used for higher stress levels. Since the third embodiment (see FIG. 10) is not intended to be fully disposable, i.e., the fluid filter shell is kept and reused, the hybrid fluid filter shell 20 is a good choice for fluid filter 66.

Figure 11:
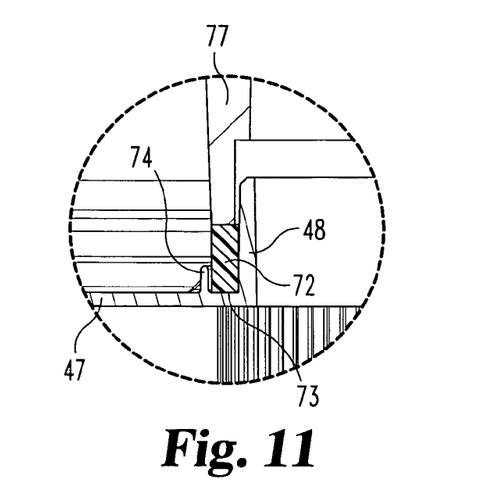
FIG. 11 is a side elevational view of an enlarged detail, based on FIG. 7, illustrating the use of a sealing gasket.

Referring to FIGS. 7 and 11, another feature applicable to all three embodiments, with or without use of the hybrid fluid filter shell 20, is illustrated. This feature is related to the annular sealing gasket 72 that is positioned within annular channel 73 of endplate 41. Channel 73 is adjacent the flange 47 and surrounds sleeve 48 in a concentric manner. This portion of endplate 41 is constructed and arranged in an identical manner for endplates 60 and 67. Since the only difference in the endplates is their outside diameter, and actually endplates 46 and 47 are the same, all illustrated endplates are identical in terms of the annular channel 73 and its positioning relative to the flange 47 and sleeve 48. Referring to FIG. 7 for this description is not intended to be limiting to this first embodiment. These features are the same for all endplates. Raised annular wall 74 defines one side of channel 73 and the cylindrical wall of sleeve 48 defines the opposite side of channel 73.

When the fluid filter is threaded into head 37 (for any of the disclosed embodiments), the inner sleeve 77 of head 37 receives the upper end of sleeve 48 and extends in the direction of channel 73 so as to compress sealing gasket 72. The action of the head 37 pushing down on gasket 72 as the threaded engagement occurs, both compresses gasket 72 and applies a downward axial force on the fluid filter media pack 36. In order to maintain the fluid filter media pack 36 in a fixed position relative to the fluid filter shell 34 so that adequate gasket compression is achieved, the inside surface 78 of the fluid filter shell 34 is formed with axially-extending ribs 79 (see FIGS. 7-10). As is illustrated in FIGS. 7 and 8, the upper end 80 of each rib 79 is constructed and arranged so as to be positioned below the retaining ridge 56 and beneath lip 49. In this way, as the fluid filter media pack 36 is pushed into the shell 34, a point of abutment is reached between ribs 79 and lip 49 and this point of abutment sets the maximum insertion depth of the fluid filter media pack 36 into shell 34. This construction is the same for all embodiments using the plastic shell. For the hybrid shell 20 of FIGS. 1-3, the abutment ribs 81 are molded as part of plastic sleeve 22. The upper end 82 of each rib 81 is positioned at the same location as the upper end 80 of each rib 79 relative to head 37. This means that the fluid filter media pack is positioned the same regardless of which style of fluid filter shell is selected.

As can be seen from FIG. 8, the axial dimension between the lower surface of retaining ridge 56 and the upper surface of end 80 is slightly larger than the thickness of the radial tip 83 of each section 51. As will be understood, the axial force of the head sleeve 77 on gasket 72 keeps the fluid filter media pack 36 securely against the ends 80 of ribs 79, preventing any back and forth axial movement of the fluid filter media pack 36. In effect, the gasket not only acts as an outlet seal between the fluid filter and the head, but the gasket also acts as a spring to bias the media pack. Sealing between the fluid filter and the head for the fluid inlet is achieved by O-ring 87 that is positioned in annular groove 88, see FIG. 8. A similarly located groove 27 is included as part of sleeve 22 and has a virtually identical positional relationship relative to the head.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A fluid filter constructed and arranged for threaded engagement with a fluid-delivery head, the fluid filter comprising:

a fluid filter shell having a sidewall formed with a radially inwardly protruding retaining ridge, the fluid filter shell is a hybrid including a metal shell body and a molded sleeve with an insert-molded metal ring, the shell body and the sleeve being joined together by seaming the metal ring to a portion of the shell body;

a fluid filter media pack installed into the fluid filter shell, the fluid filter media pack including filtering media and an upper endplate bonded to an upper end of the filtering media; and the upper endplate including a peripheral lip that is constructed and arranged to snap into position axially beneath the retaining ridge.

2. The fluid filter of claim 1 wherein the peripheral lip is formed with a spaced-apart plurality of lip sections, the lip sections defining a spaced-apart plurality of fluid flow openings, and wherein the retaining ridge is an annular ridge.

3. The fluid filter of claim 2 wherein the upper endplate includes an exit flow sleeve and the fluid filter further includes an outlet sealing gasket cooperating with the exit flow sleeve.

4. The fluid filter of claim 1 wherein the fluid filter shell includes an externally-threaded open end for threaded engagement with the fluid-delivery head, and wherein the retaining ridge is an annular ridge.

5. The fluid filter of claim 4 wherein the fluid filter shell defines a gasket groove adjacent to the externally-threaded open end and the fluid filter further includes a gasket positioned in the gasket groove for inlet flow sealing between the fluid filter and the fluid-delivery head.

6. The fluid filter of claim 5 wherein the peripheral lip is formed with a spaced-apart plurality of lip sections, the lip sections defining a spaced-apart plurality of fluid flow openings.

7. The fluid filter of claim 6 wherein the upper endplate includes an exit flow sleeve and the fluid filter further includes an outlet sealing gasket cooperating with the exit flow sleeve.

8. The fluid filter of claim 5 wherein the fluid filter shell includes an annular inner surface and defines a plurality of axial ribs on the inner surface, and wherein the axial ribs support the upper endplate of the media pack.

9. The fluid filter of claim 8 wherein each axial rib of the plurality includes an upper end that is positioned beneath the peripheral lip.

10. The fluid filter of claim 9 wherein the upper endplate includes an exit flow sleeve and the fluid filter further includes an outlet sealing gasket cooperating with the exit flow sleeve.

11. A fluid filter constructed and arranged for threaded engagement with a fluid-delivery head, the fluid filter comprising:

a fluid filter shell having a sidewall and an externally-threaded open end, the fluid filter shell is a hybrid including a metal shell body and a molded sleeve with an insert-molded metal ring, the shell body and the sleeve being joined together by seaming the metal ring to a portion of the shell body;

a fluid filter media pack installed into the fluid filter shell, the fluid filter media pack including filtering media and an upper endplate bonded to an upper end of the filtering media; and the upper endplate including a peripheral lip that is constructed and arranged to assemble into the fluid filter shell with an interference press-fit against the sidewall around substantially all of an inner perimeter of the sidewall, and wherein the fluid filter does not include any nutplate.

12. The fluid filter of claim 11 wherein the peripheral lip is formed with a spaced-apart plurality of lip sections, the lip sections defining a spaced-apart plurality of fluid flow openings.

13. The fluid filter of claim 12 wherein the upper endplate includes an exit flow sleeve and the fluid filter further includes an outlet sealing gasket cooperating with the exit flow sleeve.

14. The fluid filter of claim 11 wherein the fluid filter shell defines a gasket groove adjacent to the externally-threaded open end and the fluid filter further includes a gasket positioned in the gasket groove for inlet flow sealing between the fluid filter and the fluid-delivery head.

15. The fluid filter of claim 14 wherein the peripheral lip is formed with a spaced-apart plurality of lip sections, the lip sections defining a spaced-apart plurality of fluid flow openings.

16. The fluid filter of claim 15 wherein the upper endplate includes an exit flow sleeve and the fluid filter further includes an outlet sealing gasket cooperating with the exit flow sleeve.

17. The fluid filter of claim 11 wherein the fluid filter shell includes an annular inner surface and defines a plurality of axial ribs on the inner surface, and wherein the axial ribs support the upper endplate of the media pack.

18. The fluid filter of claim 17 wherein each axial rib of the plurality includes an upper end that is positioned beneath the peripheral lip.

19. A fluid filter constructed and arranged for threaded engagement with a fluid-delivery head, the fluid filter comprising:
- a fluid filter shell having a sidewall and an externally-threaded open end, the fluid filter shell is a hybrid including a metal shell body and a molded sleeve with an insert-molded metal ring, the shell body and the sleeve being joined together by seaming the metal ring to a portion of the shell body;
- a fluid filter media pack installed into the fluid filter shell, the fluid filter media pack including filtering media and an upper endplate bonded to an upper end of the filtering media; and
- the upper endplate including a peripheral lip that is constructed and arranged with a clearance fit relative to the fluid filter shell sidewall, the fluid filter media pack being replaceable and supported by a plurality of axially-extending ribs formed on an annular inner surface of the sidewall of the shell, and wherein the fluid filter does not include any nutplate.

20. The fluid filter of claim 19 wherein the peripheral lip is formed with a spaced-apart plurality of lip sections, the lip sections defining a spaced-apart plurality of fluid flow openings.

21. The fluid filter of claim 20 wherein the upper endplate includes an exit flow sleeve and the fluid filter further includes an outlet sealing gasket cooperating with the exit flow sleeve.

22. The fluid filter of claim 21 wherein the fluid filter shell defines an O-ring groove adjacent to the externally-threaded open end and the fluid filter further includes an O-ring positioned in the O-ring groove for inlet flow sealing between the fluid filter and the fluid-delivery head.

23. The fluid filter of claim 1, wherein the upper endplate of the fluid filter media pack is supported by a plurality of axially-extending ribs formed on an annular inner surface of the sidewall of the shell, and wherein the fluid filter does not include any nutplate.

\* \* \* \* \*